United States Patent [19]
Patino et al.

[11] Patent Number: 5,898,295
[45] Date of Patent: Apr. 27, 1999

[54] TECHNIQUE FOR AVOIDING OVERCHARGING A BATTERY

[75] Inventors: Joseph Patino, Pembroke Pines; Robert B. Ford, Tamarac, both of Fla.

[73] Assignee: Motorola, Inc., Schaumburg, Ill.

[21] Appl. No.: 08/871,788

[22] Filed: Jun. 9, 1997

[51] Int. Cl.$^6$ .......................... H01M 10/44; H01M 10/46
[52] U.S. Cl. ............................................ 320/148; 320/161
[58] Field of Search .................................. 320/128, 132, 320/148, 156, 161, FOR 122, FOR 138

[56] References Cited

U.S. PATENT DOCUMENTS

| | | |
|---|---|---|
| 3,667,026 | 5/1972 | Bogut et al. . |
| 4,225,815 | 9/1980 | Lind et al. ............................. 320/161 |
| 4,371,826 | 2/1983 | Shelly .................................... 320/145 |
| 4,629,965 | 12/1986 | Fallon et al. ......................... 320/156 |
| 5,185,566 | 2/1993 | Goedken et al. . |

*Primary Examiner*—Edward H. Tso
*Attorney, Agent, or Firm*—Barbara R. Doutre

[57] ABSTRACT

By monitoring both charge current and the battery voltage (306, 308) the likelihood of overcharging a battery is reduced. Battery voltage is compared to a predetermined limit (310) and the battery goes into trickle charge if the predetermined limit is exceeded (312), but now by also determining if a positive delta in charge current has occurred (314), the charger can trickle charge the battery (312) even if the cutoff voltage is never exceeded.

3 Claims, 4 Drawing Sheets

TECHNIQUE FOR AVOIDING OVERCHARGING A BATTERY

TECHNICAL FIELD

This invention relates in general to battery charging techniques and more specifically to battery charging techniques for the prevention of overcharged batteries.

BACKGROUND

A constant voltage battery charger is a basic charger in which battery voltage is monitored during the charging sequence and once a predetermined battery voltage is reached charging stops. Basically, the constant voltage charger operates by rapid charging a battery at a predetermined charge current and then decreasing the charge current to a minimum charge, commonly referred to as trickle charge current, once the predetermined battery voltage is reached. A problem can arise, however, as the battery starts to heat up as it approaches its end of charge. The rise in battery temperature can cause a slight slump or dip in the battery voltage, and even though the battery is essentially fully charged, the constant voltage charger senses this dip in battery voltage as an incompletely charged battery. Rather than reverting to trickle charge, the constant voltage charger may continue to rapid charge a battery which is essentially fully charged. A self-perpetuating cycle of overcharging can occur where the current rises, causing the battery to heat, which in turn causes the voltage to drop, which further causes the current to increase. FIG. 1 shows a prior art graph depicting an example of this overcharging phenomena. Graph 100 shows curves comparing battery temperature 102, battery terminal voltage 104, and battery charge current 106 versus time for a battery being charged at its rated charge current. As seen on the graph 100, once a battery approaches its fully charged state (designator 108), a slight rise in battery temperature 102 causes the battery voltage 104 to drop slightly, causing the charge current 106 to ramp up (as seen between designators 108, 110), thereby increasing the charge current on an already fully charged battery.

This overcharging phenomena can also occur when the battery temperature rises as a result of a rise in ambient temperature, such as in an automotive environment. The voltage of a fully charged battery will vary depending on the ambient temperature. FIG. 2 shows a graph of typical battery charge curves for a 7.5 volt nickel cadmium battery charged at a rapid charge rate of 1 C (current=rated capacity of battery) in three different ambient temperature environments. Curve 202 represents the battery being charged at –30 degrees Celsius (°C.). Curve 204 represents the battery being charged at room temperature, and curve 206 represents the battery being charged at +60° C. As seen from the graph 200, the peak battery voltage varies from approximately 10.5 volts at the colder temperature to approximately 9.5 volts at the hotter temperature. Thus, if the battery cutoff voltage in the charging sequence is not set low enough, then an overcharging condition can occur at hotter temperatures as the charger continually attempts to rapid charge a battery which will never achieve the preset cutoff voltage. Unfortunately, setting the cutoff voltage to a lower voltage setting has the disadvantage of being unable to fully charge the battery to its full capacity when this same battery is being charged at room temperature or colder temperatures.

Accordingly, there is a need for an improved charging technique which addresses the problems described above.

DETAILED DESCRIPTION OF THE PREFERRED EMBODIMENT

Figure 1:
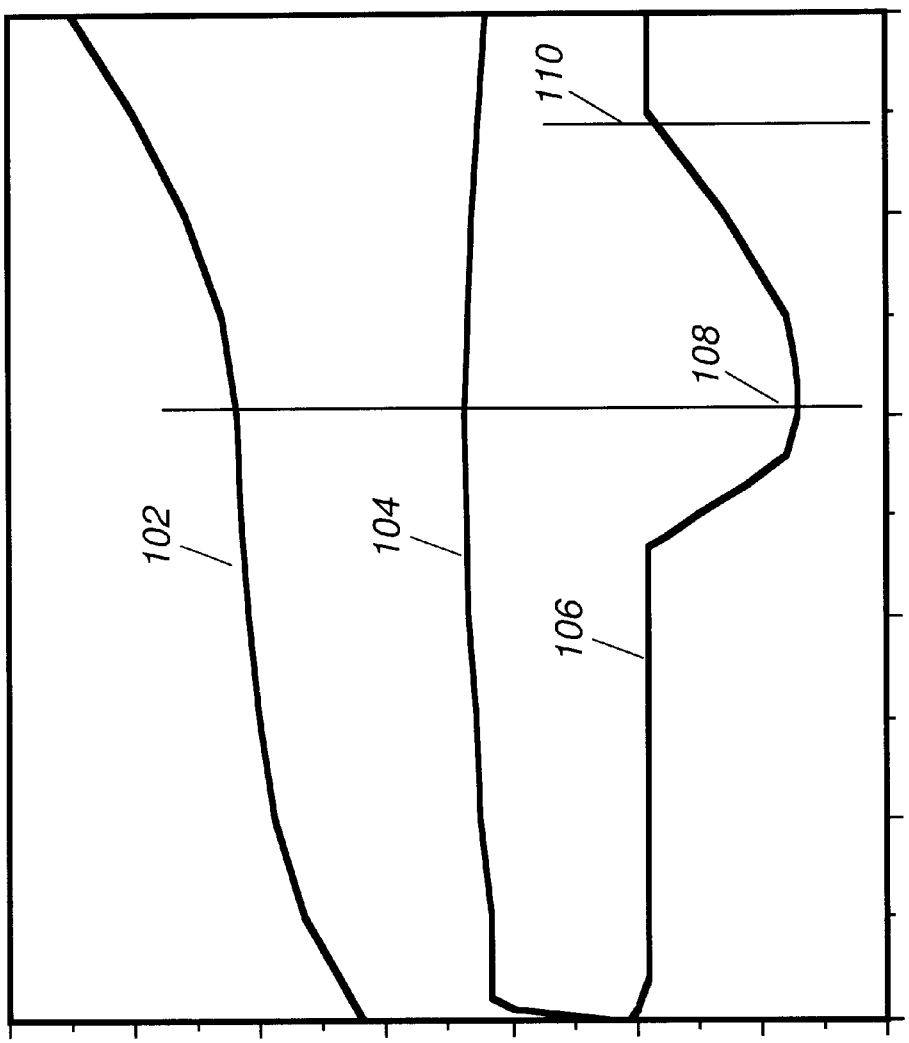
FIG. 1 is graph of battery curves depicting battery voltage, charge current, and battery temperature versus time for a battery experiencing an overcharging condition.
Figure 2:
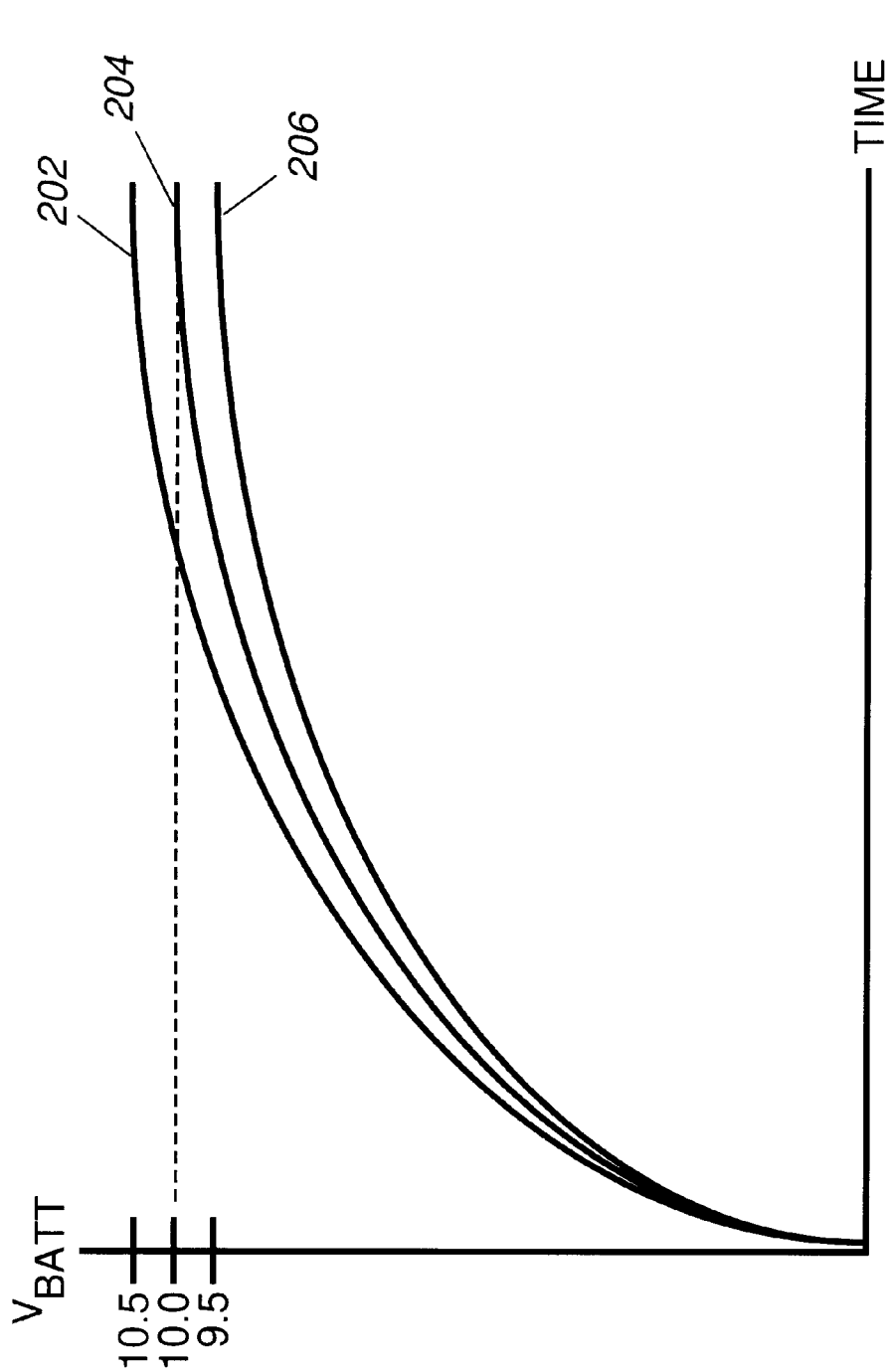
FIG. 2 is graph of characteristic battery charge curves taken over temperature.

While the specification concludes with claims defining the features of the invention that are regarded as novel, it is believed that the invention will be better understood from a consideration of the following description in conjunction with the drawing figures, in which like reference numerals are carried forward.

Figure 3:
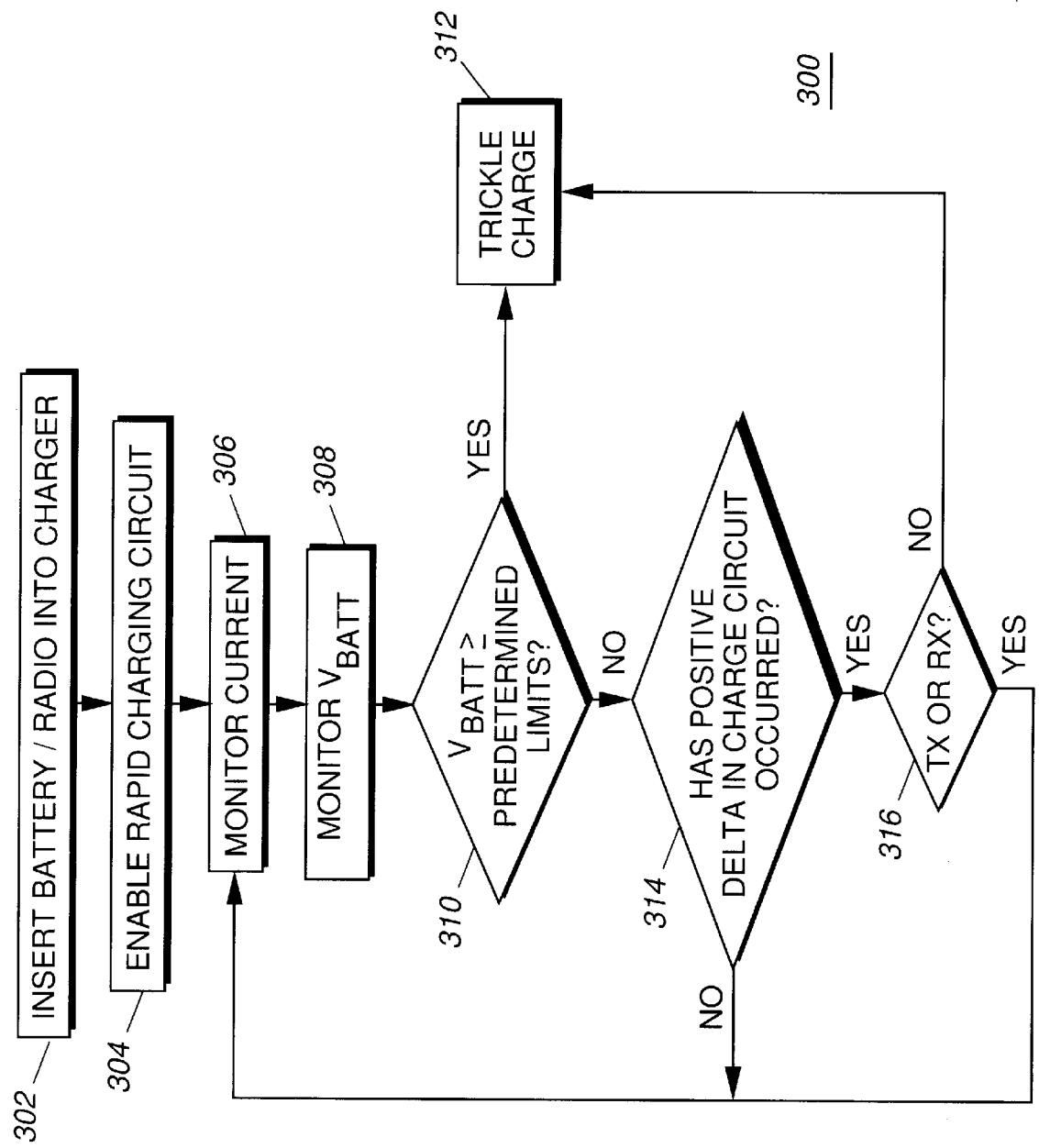
FIG. 3 is a flowchart of a battery charging sequence in accordance with the present invention.

Referring now to FIG. 3, there is shown a flowchart of a charging technique 300 in accordance with the present invention. A battery or battery/radio combination is first inserted into a charger at step 302, and the charger's rapid charge current is enabled at step 304. The charge current is monitored at step 306, and the battery voltage (Vbatt) is monitored at step 308. At step 310, the battery voltage (Vbatt) is compared to a predetermined limit set for a desired cutoff voltage. If the battery voltage exceeds the predetermined limit at step 310, the charger goes into a trickle charge mode of reduced current at step 312. If the battery voltage does not equal the predetermined limit at step 310, the charger checks for a positive delta in the charge current at step 314. If a positive delta in charge current is detected at step 314, then the charger determines if the rise in charge current occurred as a result of a radio transmit or receive condition (if a radio is coupled to the battery). If no positive change in charge current occurred at step 314, then the charger returns to step 306 to monitor the charge current and cycle through the routine again at step 306 while the battery continues to rapid charge. If no transmit or receive condition is determined at step 316, the charger goes into trickle charge at step 312. If a transmit or receive condition is determined at step 316, then the charger returns to step 306 to monitor the charge current as the battery continues to be rapid charged.

Figure 4:
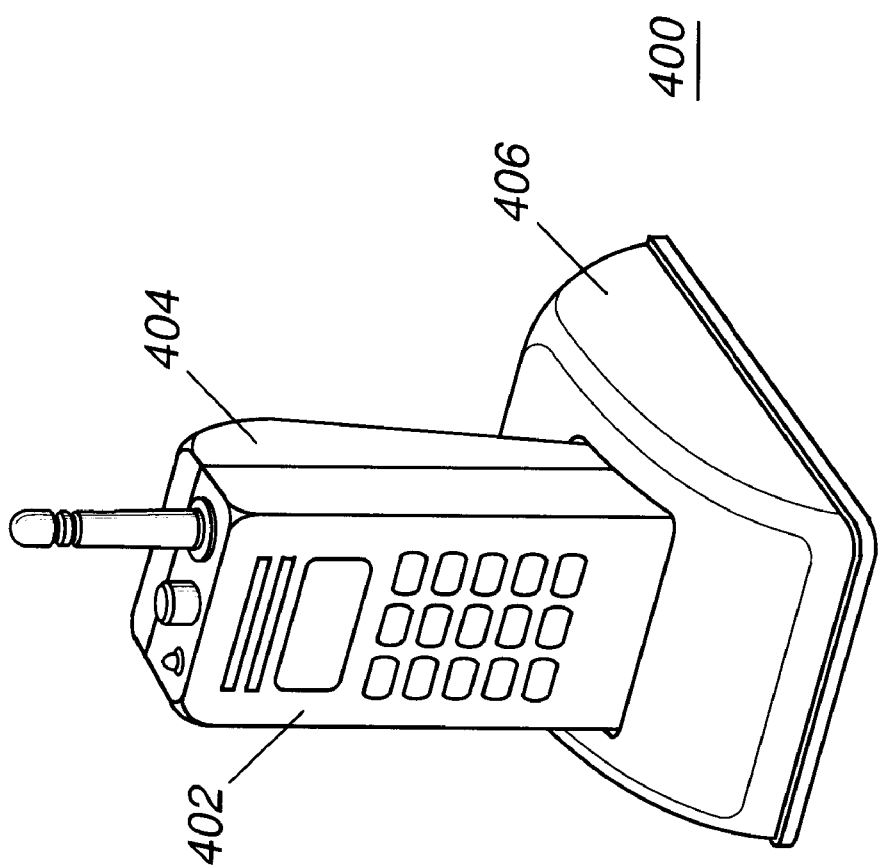
FIG. 4 is a battery charging system utilizing the battery charging technique of the present invention.

FIG. 4 shows a charging system 400 which utilizes the charging technique 300 described by the invention. Charging system 400 includes a radio 402, a battery 404 the battery being coupled to the radio 402, and the radio/battery combination inserted within charger 406. Charger 406 utilizes the charging sequence described by the invention to prevent the battery 404 from being overcharged during the charge cycle. The battery is shown coupled to the radio simply to reiterate that the charge sequence does not interfere with radio operation while the radio is inserted into the charger, however, it is not necessary for the radio to be coupled to the battery.

The charging sequence 300 of the present invention permits a battery to be charged in a constant voltage battery charger without overcharging the battery. By applying a charge current to the battery, monitoring the battery voltage, and then comparing the battery voltage to a predetermined limit, the battery can be trickle charged when the battery voltage exceeds this predetermined limit (as in the past). However, by also monitoring the charge current, detecting whether a positive delta in charge current has occurred, and trickle charging the battery if a positive delta in charge current has occurred, the charging technique of the present invention allows for a higher cutoff voltage setting thereby ensuring maximum charge capacity of the battery, even in warmer temperatures.

The charging technique described by the invention essentially looks for positive delta changes in the charge current which would be occurring as a result of the charger trying to charge the battery with increased charge current when the battery is already essentially fully charged, such as might occur at hotter temperatures. By trickle charging the battery when a positive delta in charge current is determined, the likelihood of overcharging a battery is reduced, even if the cutoff voltage is never exceeded.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging a battery in a charger, comprising the steps of:

rapid charging a battery;

determining if a positive delta in charge current has occurred; and trickle charging the battery if a positive delta in charge current is determined.

2. A method of charging a battery in a charger, comprising the steps of:

applying a charge current;

monitoring the charge current;

monitoring the battery voltage;

comparing the battery voltage to a predetermined limit;

trickle charging the battery when the battery voltage exceeds a predetermined limit;

detecting whether a positive delta in charge current has occurred; and trickle charging the battery if a positive delta in charge current has occurred.

3. A method of charging a battery in a battery charging system, comprising the steps of:

inserting a battery coupled to a radio into the charger;

enabling the charge current;

monitoring the charge current;

monitoring the battery voltage;

comparing the battery voltage to a predetermined limit;

trickle charging the battery when the battery voltage exceeds the predetermined limit;

determining if a positive delta in charge current has occurred;

determining if the positive delta current was generated due to a receive or transmit radio condition; and trickle charging the battery if no transmit or receive condition is determined.

* * * * *